United States Patent
Ramin et al.

(10) Patent No.: US 12,418,570 B2
(45) Date of Patent: Sep. 16, 2025

(54) REAL-TIME AND FILE-BASED AUDIO DATA PROCESSING

(71) Applicant: Google LLC, Mountain View, CA (US)

(72) Inventors: Marvin Tobi Ramin, Zurich (CH);
Siarhei Salnikau, Zurich (CH);
Madhava Gauranga Srinivasan, Zurich (CH)

(73) Assignee: Google LLC, Mountain View, CA (US)

( * ) Notice: Subject to any disclaimer, the term of this patent is extended or adjusted under 35 U.S.C. 154(b) by 273 days.

(21) Appl. No.: 18/029,957

(22) PCT Filed: Oct. 1, 2021

(86) PCT No.: PCT/US2021/053105
§ 371 (c)(1),
(2) Date: Apr. 3, 2023

(87) PCT Pub. No.: WO2022/072786
PCT Pub. Date: Apr. 7, 2022

(65) Prior Publication Data
US 2023/0370506 A1    Nov. 16, 2023

Related U.S. Application Data
(60) Provisional application No. 63/086,953, filed on Oct. 2, 2020.

(51) Int. Cl.
*H04L 65/1094*    (2022.01)
*H04L 65/1059*    (2022.01)
(Continued)

(52) U.S. Cl.
CPC ...... *H04L 65/1094* (2022.05); *H04L 65/1059* (2013.01); *H04L 65/4025* (2022.05); *H04L 65/61* (2022.05)

(58) Field of Classification Search
CPC ........ G06F 3/00; G06F 3/167; G06F 16/9535; G06F 3/0488; G06F 3/04886;
(Continued)

(56) References Cited

U.S. PATENT DOCUMENTS 9,437,188 B1 *  9/2016  Medina ............... G10L 15/22
9,569,167 B2 *  2/2017  Watts .................. H04L 65/70
(Continued)

FOREIGN PATENT DOCUMENTS

CN    107481709 A    12/2017
CN    109976696 A    7/2019
(Continued)

OTHER PUBLICATIONS

Pavlos, B. & Marios, I., "Voice Commands for Bluetooth Low Energy Remote Controls", Renesas, White Paper, Apr. 1, 2018, pp. 1-10.
(Continued)

*Primary Examiner* — Gerald Gauthier
(74) *Attorney, Agent, or Firm* — Brake Hughes Bellermann LLP

(57) ABSTRACT

This application is directed to dynamically transferring audio data in real time or in batch. A microphone of a first electronic device captures audio signals. The audio signals are sampled to provide a first sequence of audio data samples and a second sequence of audio data samples that follows the first sequence. The second electronic device receives the first and second sequences of audio data samples, and processes the first sequence of audio data samples into audio data packets according to a real time data processing mode. The second electronic device determines that the second electronic device cannot support processing of audio data samples in the real time data processing mode, caches the second sequence of audio data samples in a buffer, and
(Continued)

generates a data file including the second sequence of audio data samples in a batch data processing mode.

23 Claims, 7 Drawing Sheets

(51) Int. Cl.
    *H04L 65/402*     (2022.01)
    *H04L 65/61*     (2022.01)

(58) Field of Classification Search
    CPC ........ G06F 3/165; G06F 16/43; G06F 16/635; G06F 16/748; G06F 16/90332; G06N 5/04; G10L 15/08; G10L 15/083; G10L 15/22; G10L 15/30; G10L 15/1807; G10L 15/187; G10L 19/00; G10L 19/008; G10L 19/012; G10L 19/02; G10L 19/0212; G10L 19/07; G10L 19/24; G10L 21/038; G10H 15/22; H04L 65/1029; H04L 65/1059; H04L 65/1094; H04L 65/1101; H04L 65/4025; H04L 65/61; H04L 65/612; H04L 65/70; H04L 65/764; H04N 21/42204; H04N 21/8106; G06V 10/17; G06V 10/764; G09G 5/026; G11B 31/00; H04R 1/406; H04W 4/02
    See application file for complete search history.

(56) References Cited

U.S. PATENT DOCUMENTS

| | | | | |
|---|---|---|---|---|
| 11,482,224 | B2* | 10/2022 | Smith | G10L 15/083 |
| 11,657,800 | B2* | 5/2023 | Kim | G10L 15/08 |
| | | | | 704/200 |
| 11,809,783 | B2* | 11/2023 | Piersol | G10L 15/30 |
| 11,947,872 | B1 | 4/2024 | Mahler-Haug | G10L 15/08 |
| 2007/0244700 | A1* | 10/2007 | Kahn | G10L 15/22 |
| | | | | 704/E15.04 |
| 2007/0244702 | A1* | 10/2007 | Kahn | G10L 15/22 |
| | | | | 704/E15.04 |
| 2007/0280209 | A1* | 12/2007 | Ramani | H04L 65/1101 |
| | | | | 370/356 |
| 2008/0039966 | A1* | 2/2008 | Redgewell | H04L 65/612 |
| | | | | 700/94 |
| 2008/0052083 | A1* | 2/2008 | Shalev | G06F 16/748 |
| | | | | 704/500 |
| 2009/0043590 | A1* | 2/2009 | Ojanpera | G10L 19/012 |
| | | | | 704/500 |
| 2010/0217669 | A1* | 8/2010 | Gazdzinski | G06F 3/04886 |
| | | | | 345/173 |
| 2010/0241438 | A1* | 9/2010 | Oh | G10L 19/008 |
| | | | | 704/500 |
| 2011/0028215 | A1* | 2/2011 | Herr | G10L 19/00 |
| | | | | 463/43 |
| 2012/0203561 | A1* | 8/2012 | Villette | G10L 19/0212 |
| | | | | 704/500 |
| 2013/0096928 | A1* | 4/2013 | Jeong | G10L 19/24 |
| | | | | 704/500 |
| 2013/0103407 | A1* | 4/2013 | Jeong | G10L 19/07 |
| | | | | 704/500 |
| 2013/0151263 | A1* | 6/2013 | Lee | G10L 19/02 |
| | | | | 704/500 |
| 2014/0149126 | A1* | 5/2014 | Souldore | G10L 21/038 |
| | | | | 704/500 |
| 2015/0032238 | A1 | 1/2015 | Ondo et al. | |
| 2015/0301836 | A1* | 10/2015 | Chung | H04N 21/42204 |
| | | | | 713/2 |
| 2016/0321028 | A1 | 11/2016 | Doerbecker | |
| 2018/0182379 | A1* | 6/2018 | Montantes | G06N 5/04 |
| 2018/0190275 | A1* | 7/2018 | Bhaya | G06F 16/90332 |
| 2018/0329671 | A1* | 11/2018 | Einziger | G06F 3/00 |
| 2018/0358022 | A1* | 12/2018 | Karnati | G06F 16/43 |
| 2019/0034542 | A1* | 1/2019 | Ming | G06F 16/9535 |
| 2019/0147860 | A1* | 5/2019 | Chen | G10L 15/08 |
| | | | | 704/251 |
| 2019/0189128 | A1* | 6/2019 | Civelli | G10L 15/30 |
| 2019/0206392 | A1* | 7/2019 | Abramov | H04N 21/8106 |
| 2019/0220245 | A1* | 7/2019 | Martel | G06F 3/167 |
| 2019/0236976 | A1* | 8/2019 | Horban | H04R 1/406 |
| 2019/0355359 | A1* | 11/2019 | Bhaya | G10L 15/30 |
| 2019/0372824 | A1 | 12/2019 | Montero et al. | |
| 2020/0126545 | A1* | 4/2020 | Kakkar | G06V 10/764 |
| 2020/0168113 | A1* | 5/2020 | Rodriguez Bravo | G06V 10/17 |
| 2020/0168217 | A1* | 5/2020 | Webster | G11B 31/00 |
| 2020/0193981 | A1* | 6/2020 | Ji | G10L 15/08 |
| 2020/0218767 | A1* | 7/2020 | Ritchey | G09G 5/026 |
| 2021/0034662 | A1* | 2/2021 | Aher | G10L 15/1807 |
| 2021/0034663 | A1* | 2/2021 | Aher | G06F 16/635 |
| 2021/0035587 | A1* | 2/2021 | Aher | G10L 15/187 |
| 2021/0055909 | A1* | 2/2021 | Rahim | G10L 15/22 |
| 2021/0174795 | A1* | 6/2021 | Robert Jose | G06F 3/165 |
| 2022/0223150 | A1* | 7/2022 | Li | G10L 15/08 |
| 2022/0238118 | A1* | 7/2022 | Mazzoccoli | G06F 3/165 |
| 2023/0370506 | A1* | 11/2023 | Ramin | H04L 65/4025 |

FOREIGN PATENT DOCUMENTS

| | | |
|---|---|---|
| JP | 2017220807 A | 12/2017 |
| JP | 2019505023 A | 2/2019 |
| JP | 2019169812 A | 10/2019 |
| JP | 2020521995 A | 7/2020 |
| KR | 20070036248 A | 4/2007 |
| KR | 20110053177 A | 5/2011 |

OTHER PUBLICATIONS

First Office Action for Chinese Application No. 202180067092.3 (with English translation), mailed Oct. 28, 2024, 17 pages.
Office Action for Korean Application No. 10-2023-7013865 (with English translation), mailed Oct. 7, 2024, 10 pages.
Office Action for Japanese Application No. 2023-520198 (with English translation), mailed Jun. 4, 2024, 8 pages.

* cited by examiner

REAL-TIME AND FILE-BASED AUDIO DATA PROCESSING

CROSS-REFERENCE TO RELATED APPLICATION

This application claims the benefit of U.S. Provisional Application No. 63/086,953, filed Oct. 2, 2020, which is incorporated by reference herein in its entirety.

TECHNICAL FIELD

This application relates generally to audio data transfer and processing, including but not limited to methods and systems for providing real time and file-based audio data processing to facilitate data transfer and speech recognition in electronic devices.

BACKGROUND

Electronic devices having microphones are widely used as assistant devices to collect voice inputs from users and initiate different voice-activated functions according to the voice inputs. For example, many remote control devices coupled to digital television devices are configured to integrate microphones. Voice inputs of these remote control devices are streamed to and at least partially processed by the digital television devices. The digital television devices may submit the voice inputs (pre-processed or not) to a remote server system for additional audio processing. User requests are extracted from the voice inputs for initiating the voice-activated functions as a result of audio processing at the television devices and/or remote server system. Any deficiency in communication, caching and processing capabilities of the television devices can cause a delay in the initiation of the voice-activated functions. This often happens to low-cost television devices that have limited capabilities. It would be beneficial to have a more efficient data processing and transfer mechanism than the current practice to compensate for the deficiencies in these devices' communication, caching or processing capabilities.

SUMMARY

This application is directed to processing and transfer audio data received from an electronic device having a microphone (e.g., a remote control device, an assistant device). The electronic device is coupled to another electronic device (e.g., a television device) that has audio processing capabilities or is coupled to a server having audio processing capabilities. These two electronic devices are coupled via a communication channel. The audio data is transferred in real time via the communication channel, and processed in real time or in batch by the receiving electronic device depending on whether communication, computation and storage of the receiving electronic device can support processing of audio data samples in real time. Real time audio data processing is thereby supplemented by the batch audio data processing, particularly in some electronic devices that do not always have sufficient resources to communicate, cache or process the audio data in real time.

Specifically, in one aspect, a method is implemented to process audio data, e.g., switch from a real time data processing mode to a batch data processing mode. The method includes receiving, from a first electronic device (e.g., a remote control device) and by a second electronic device (e.g., a television device), a first sequence of audio data samples and a second sequence of audio data samples. The second sequence of audio data samples follows the first sequence of audio data samples in audio signals captured by a microphone of the first electronic device. The method further includes processing by the second electronic device the first sequence of audio data samples according to a real time data processing mode and determining that the second electronic device cannot support processing of audio data samples in the real time data processing mode. The method further includes in accordance with the determination that the second electronic device cannot support processing of audio data samples in the real time data processing mode, caching, in a buffer of the second electronic device, the second sequence of audio data samples and generating a data file including the second sequence of audio data samples in a batch data processing mode.

Alternatively, in another aspect, a method is implemented to process audio data, e.g., switch from a batch data processing mode to a real time data processing mode. The method includes receiving, from a first electronic device (e.g., a remote control device) and by a second electronic device (e.g., a television device), a first sequence of audio data samples and a second sequence of audio data samples. The second sequence of audio data samples follows the first sequence of audio data samples in audio signals captured by a microphone of the first electronic device. The method further includes processing by the second electronic device the first sequence of audio data samples according to a batch data processing mode, which further includes caching, in a buffer of a second electronic device, the first sequence of audio data samples, and generating a data file including the first sequence of audio data samples. The method further includes determining that the second electronic device can support processing of audio data samples in a real time data processing mode. The method further includes in accordance with the determination that the second electronic device can support processing of audio data samples in the real time data processing mode, processing by the second electronic device the second sequence of audio data samples according to the real time data processing mode.

A non-transitory computer-readable medium has instructions stored thereon, which when executed by one or more processors cause the processors to perform the method of any of the above methods. An electronic device includes one or more processors and memory having instructions stored thereon, which when executed by the one or more processors cause the processors to perform the method of any of the above methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF THE IMPLEMENTATIONS

Figure 1:
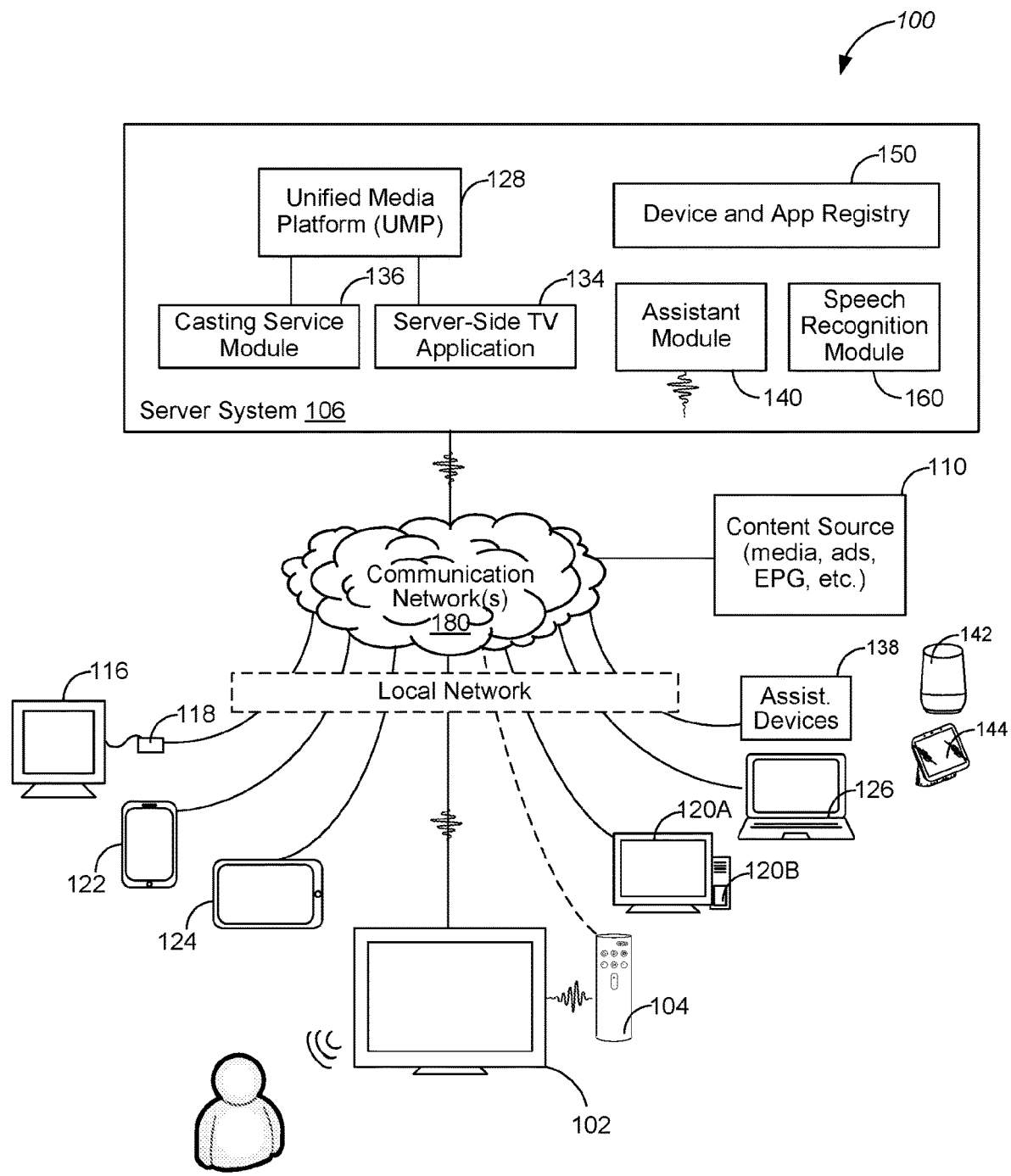
FIG. 1 is an example media environment in which a network-connected TV device, a remote control device, and a server system interact with each other via one or more communication networks, in accordance with some implementations.

Many electronic devices (e.g., a remote control device, voice-activated display or speaker devices) include microphones used to collect voice inputs from an environment where the electronic devices are disposed. Such an electronic device may be configured to collect the voice inputs automatically upon detecting hot words in an audio signal or in response to a user press on a dedicated assistant button of the electronic device. Upon receiving a voice input, the electronic device communicates the voice input to a remote server system (e.g., an assistant server) via one or more communication network, and the remote server system recognizes a user request in the voice input and responds to the user request. In an example, the electronic device includes a remote control device, and the voice input is initiated to control a network-connected television (TV) device coupled to the remote control device. The remote control device sends the voice input to the remote server system via the TV device, and the voice input is processed at the TV device before the TV device sends the voice input to the remote server system. During this process of processing the voice input, the TV device uses its communication, computation and storage capabilities to bridge the remote control device and the remote server system.

Audio data delivered to an audio manager of the TV device may be different from what is collected by a microphone of the remote control device. This happens due to various factors, e.g., loss and delay of data packets via a communication channel that couples the remote control and TV devices, processor load of the TV device. In various implementations of this application, a combination of real time data processing and file-based batch data processing is implemented at a second electronic device (e.g., the TV device) to process audio data collected by a microphone of a first electronic device (e.g., the remote control device). In some implementations, real-time data processing has a priority over filed-based batch data processing. When it is determined that at least one of communication, computation and storage capabilities of the second electronic device cannot support processing of audio data samples in real time, subsequent data samples are cached and organized into a data file at the second electronic device (e.g., processed by an audio data processing module distinct from the audio manager). Alternatively, when it is determined that communication, computation and storage capabilities of the second electronic device can support processing of audio data samples in real time, subsequent data samples are processed into data packets by the second electronic device in real time (e.g., processed by the audio manager, which is part of an operating system of the second electronic device). Such a controlled audio data transfer process streamlines data processing and communication at the second electronic device and improves performance, audio quality, and user experience associated with voice inputs that initiate user interactions with the electronic devices.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example media environment 100 in which a network-connected TV device 102, a remote control device 104, and a server system 106 interact with each other via one or more communication networks 180, in accordance with some implementations. The media environment 100 corresponds to a virtual user domain created and hosted by the server system 106, and the virtual user domain includes a plurality of user accounts. For each user account, the server system 106 is coupled to a content source 110 and one or more media devices 102 and 116-126, and is configured to stream media content provided by the content source 110 for review by a user via the respective user account. Optionally, the content source 110 includes one or more of: ads sources, electronic program guide (EPG) sources, and media content sources.

Specifically, the one or more media devices associated with the user and the user account are disposed in the media environment 100 to provide the user with media content that is stored at and streamed from the content source 110. The content source 110 is optionally a third-party media content source or an internal media source hosted by the server system 106. In some implementations, the one or more media devices include the network-connected TV device 102 which directly streams the media content from the remote content source or integrates an embedded casting unit configured to stream the media content for display to its audience. The network-connected TV device 102 is communicatively coupled to a dedicated remote control device 104 and/or an electronic device having a remote control application (e.g., a mobile phone 122, a tablet computer 124, a laptop computer 126, an assistant device 138). The dedicated remote control device 104 may be disposed in proximity to the TV device 102 and configured to communicate with the TV device 102 with digitally-coded pulses of infrared signals. Alternatively, in some situations, the dedicated remote control device 104 or electronic device having the remote control application is configured to communicate with the TV device 102 via the communication networks 180 (i.e., via a short-range communication link, a local area network and/or a wide area network), and does not have to be physically in proximity to the TV device 102.

The network-connected TV device 102 includes one or more processors and memory storing instructions for execution by the one or more processors. The instructions stored on the network-connected TV device 102 include one or more of: a unified TV application, a local content casting application, a remote control application, an assistant application, and one or more media play applications associated with the content source 110. These applications are user applications distinct from an operating system of the TV device 102, and are optionally linked to the user account in the virtual user domain of the media environment 100. Additionally, the network-connected TV device 102 includes an audio manager (e.g., 234 in FIG. 2) integrated in its operating system to process audio data on a data packet level.

Alternatively, in some implementations, the media devices disposed in the media environment 100 include a display device 116 that directly outputs the media content to an audience and a casting device 118 that is coupled to and configured to stream the media content to the display devices 116. Examples of the display device 116 include, but are not limited to, television (TV) display devices and music players. Examples of the casting device 118 include, but are not limited to, set-top boxes (STBs), DVD players and TV boxes. In this example shown in FIG. 1, the display device 116 includes a TV display that is hard wired to a DVD player or a set-top box 118. In contrast, in some implementations, the media devices disposed in the media environment 100 include a computer screen 120A that outputs the media content to audience and a desktop computer 120B that streams the media content to the computer screen 120A. In some implementations, the media devices disposed in the media environment 100 includes a mobile device, e.g., a mobile phone 122, a tablet computer 124 and a laptop computer 126. Each of the media devices 118-126 includes one or more media play applications configured to receive and play media content items provided by the content source 110 or internal media source associated with the server system 106.

The server system 106 includes a unified media platform (I-JWP) 128 configured to manage media content recommendation and streaming for the one or more media devices in the media environment 100. Media content recommendations generated by the I-AAP 128 are presented on the network-connected TV device 102 via a server-side TV application 134, and the server-side TV application 134 enables display of media content on the unified TV application on the TV device 102 in response to a user selection from the media content recommendations. Moreover, the UNIP 128 may also function as a centralized media content management module configured to provide the media content recommendations to other media devices 118-126 in addition to the TV device 102. In some implementations, activity data associated with each user account is collected from the TV application 134 and casting service module 136, and used to personalize the media content recommendations provided to a user of the user account.

In some implementations, in addition to one or more of the media devices 102, 104, and 116-126, a user account of the virtual user domain hosted by the server system 106 is also associated with one or more devices of other types, e.g., network-connected assistant devices 138 that are installed in the media environment 100. Examples of the assistant devices 138 include a speaker assistant device 142 and a display assistant device 144. The speaker assistant device 142 is capable of collecting audio inputs, recognizing user commands from the audio inputs, and implementing operations (e.g., playing music, answering questions) in response to the user commands. The display assistant device 144 is capable of collecting audio and/or video inputs, recognizing user commands from the audio and/or video inputs, and implementing operations (e.g., playing music, presenting an image or video clip, answering questions) in response to the user commands. Each of the assistant devices 138 is optionally managed by a dedicated device application or a generic user application (e.g., a web browser), and linked to the user account in the virtual domain in conjunction with the unified TV application of the network-connected TV device 102.

Further, in some implementations, the server system 106 includes an assistant module 140 that is optionally powered by artificial intelligence. The assistant module 140 is configured to recognize user requests from voice inputs collected by a microphone and initiate operations to search the Internet, schedule events and alarms, adjust hardware settings, present public or private information, play media content items, have a two-way conversation with a user, purchase products, transfer money, or the like. The microphone is integrated in any of the media devices 102, 104, and 116-126 and the assistant devices 138 disposed in the media environment 100. In some implementations, the assistant module 140 is coupled to a speech recognition module 160 that is configured to process the voice inputs collected by the microphone and identify user requests from the voice inputs, e.g., using natural language processing (NLP) algorithms.

In some implementations, the server system 106 includes a device and application registry 150 configured for storing information of one or more user accounts managed by the server system 106 and information of user devices and applications associated with each of the one or more user accounts. For example, the device and application registry 150 stores information of the network-connected TV device 102, remote control device 104, media devices 116-126, assistant devices 138 and information of the corresponding unified TV application, remote control application, media play applications, and dedicated device applications associated with the assistant devices 138.

Optionally, these media devices and assistant devices associated with the same user account are distributed across different geographical areas. Optionally, these devices are located at the same physical location. Each media or assistant device communicates with another device or the server system 106 using the one or more communication networks 180. The communication networks 180 used can be one or more networks having one or more type of topologies, including but not limited to the Internet, intranets, local area networks (LANs), cellular networks, Ethernet, Storage Area Networks (SANs), telephone networks, Bluetooth personal area networks (PAN) and the like. In some implementations, two or more devices in a sub-network are coupled via a wired connection, while at least some of devices in the same sub-network are coupled via a local radio communication network (e.g., ZigBee, Z-Wave, Insteon, Bluetooth, Wi-Fi and other radio communication networks).

In various implementations, a first electronic device having a microphone (e.g., a remote control device 104, any of the media devices 116-126, assistant device 138) is coupled to a second electronic device (e.g., a TV device 102 or any of the media devices 116-126) having one or more processors and memory storing instructions to be executed by the one or more processors via a communication channel. The first electronic device captures an audio signal using its microphone. The audio signal is sampled to a first sequence of audio data samples and a second sequence of audio data samples that follows the first sequence of audio data samples. Optionally, the first and second sequences of audio data samples are recorded in the same recording session or during two distinct recording sessions. Each recording session is activated by a respective user action with the first electronic device (e.g., a user press on an assistant button

Figure 6:
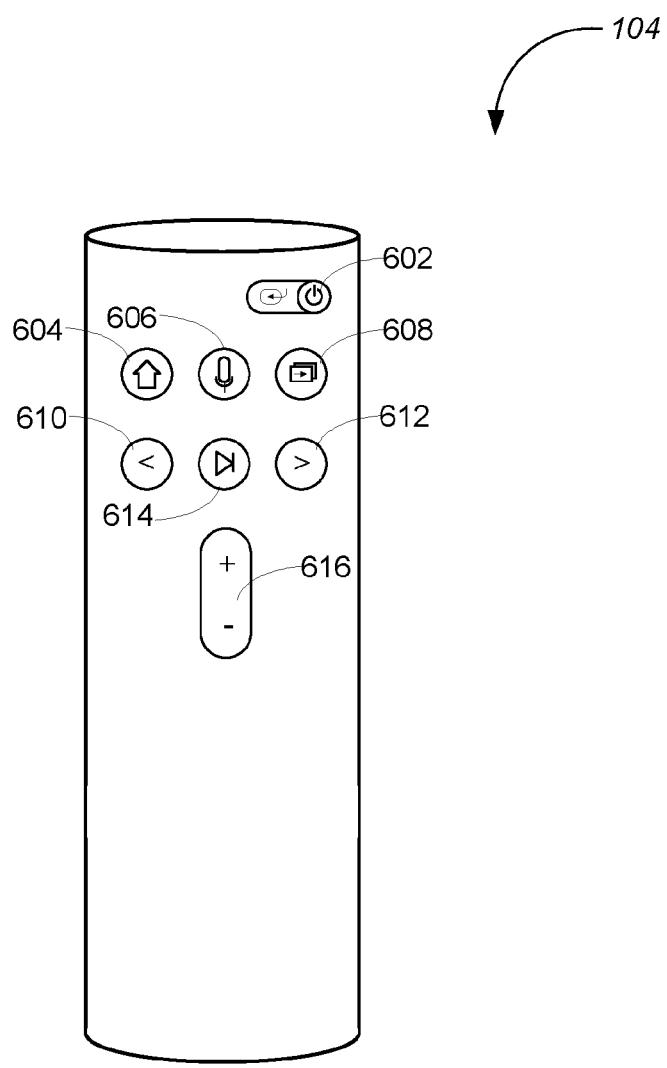
FIG. 6 illustrates an example remote control device configured to transfer audio data to a television device, in accordance with some implementations.

606 in FIG. 6). The first electronic device transfers both the first and second sequences of audio data samples to the second electronic device, which then processes each sequence of audio data sample via one of a real time data processing mode and a batch data processing mode.

While or after transferring the first sequence of audio data samples, the second electronic device determines whether communication, computation and storage capabilities of the second electronic device can support processing of audio data samples in the real time data processing mode. If at least one of communication, computation and storage capabilities of the second electronic device cannot support processing of audio data samples in the real time data processing mode, the second electronic device processes the second sequence of audio data samples in the batch data processing mode (e.g., by an audio data processing module 238, in FIG. 2, which is installed in its operating system or as a user application). In contrast, if the second electronic device can support processing of audio data samples in the real time data processing mode, the second electronic device processes the second sequence of audio data samples in the real time data processing mode (e.g., by an audio manager 234, in FIG. 2, which is integrated in its operating system). As such, the batch data processing mode is activated in accordance with a determination that the second electronic device cannot support processing of audio data samples in the real time data processing mode, e.g., when an error rate or a latency of audio data exceeds a corresponding error or latency tolerance.

Figure 2:
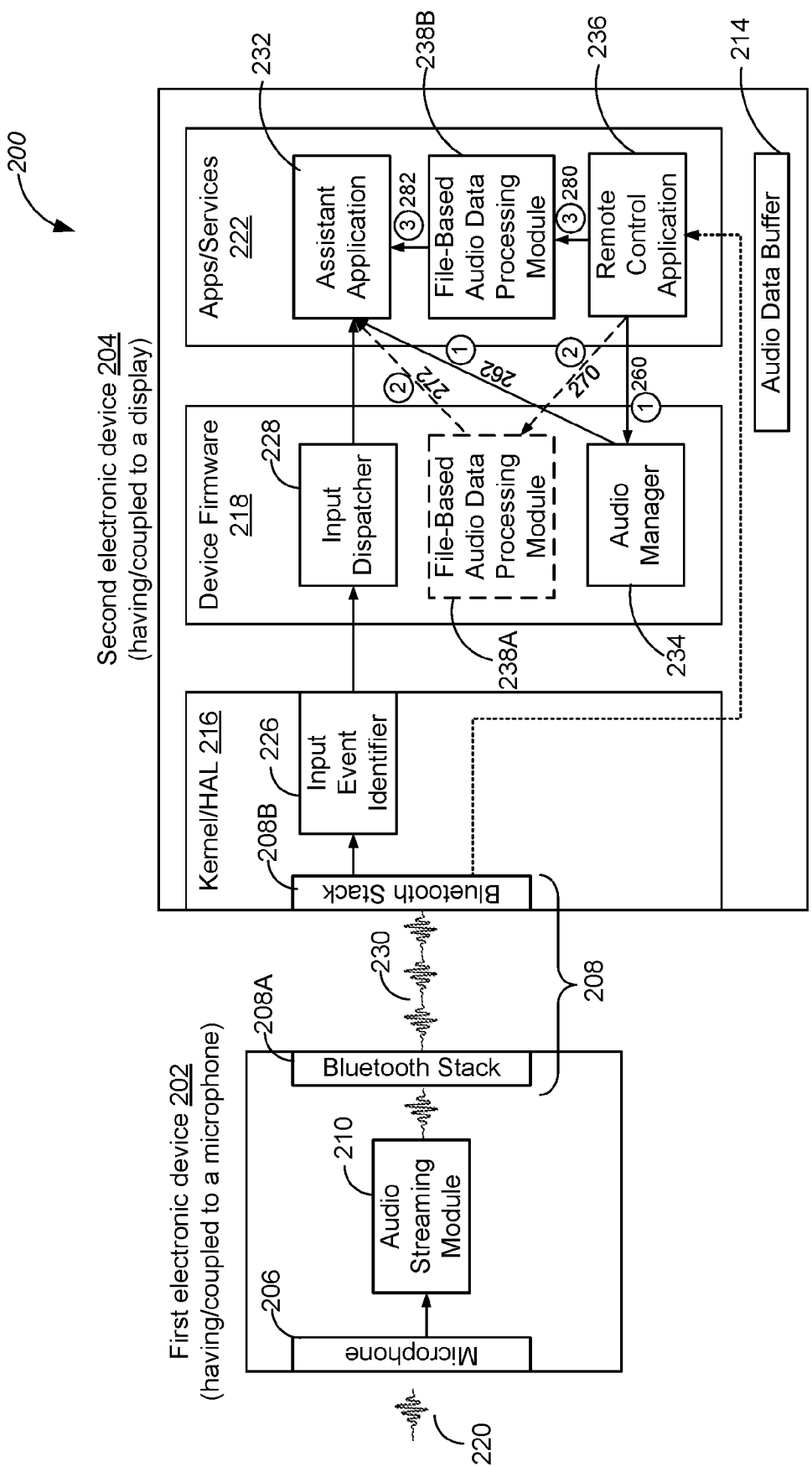
FIG. 2 is an example audio data transfer path between a first electronic device and a second electronic device, in accordance with some implementations.

FIG. 2 is an example audio data transfer path 200 between a first electronic device 202 and a second electronic device 204, in accordance with some implementations. The first electronic device 202 has or is coupled to a microphone 206 configured to capture an audio signal 220, and the second electronic device 204 is coupled to the first electronic device 202 via a communication channel 208. The audio signal 220 is sampled at the first electronic device 202, and audio data samples are transferred from the first electronic device 202 to the second electronic device 204 via the communication channel 208. The communication channel 208 is enabled by the one or more communication networks 180 including, but not limited to, a local radio communication network (e.g., ZigBee, Z-Wave, Insteon, Bluetooth, Wi-Fi and other radio communication networks). In this example audio data transfer path 200, the communication channel 208 is formed via a Bluetooth communication link that is enabled collectively by a first Bluetooth stack 208A of the first electronic device 202 and a second Bluetooth stack 208B of the second electronic device 204.

The first electronic device 202 includes an audio streaming module 210 configured to obtain audio data samples of the audio signal 220 captured by the microphone 206 and organize the audio data samples to be transferred over the communication channel 208 to the second electronic device. In some implementations, the audio streaming module 210 groups a subset of the audio data samples into an ordered sequence of audio data packets. Each data packet includes one or more consecutive audio data samples, and optionally has a preamble, message header, encoding packet data, dummy field, and integrity check field in compliance with a predefined data format (e.g., an MPEG-4 HE-ACC codec format, an EVRC voice codec format). At an input to the first Bluetooth stack 208A, a plurality of ordered sequences of audio data packets are sequentially arranged into a stream of audio data 230 for transmission over the communication channel 208. In some implementations, each data packet in the same data packet sequence corresponds to a predefined data format, while two different data packet sequences optionally correspond to the same data format or different data formats.

The second electronic device 204 includes three levels of programs, i.e., a kernel on a hardware abstraction layer (HAL) 216, device firmware 218, and application and service programs 222. The kernel on the HAL 216 and device firmware 218 are part of an operating system of the second electronic device 204, while the application and service programs 222 are external to the operating system and installed by a manufacturer or user to implement specialized computer operations (e.g., gaming, web browsing, document editing, media playing). In some implementations, after receiving operation data that optionally originate from the first electronic device 202 or any other electronic device via the second Bluetooth stack 208B, the second electronic device 204 passes the received operation data to an input event identifier 226 of the kernel on the HAL 216. The input event identifier 226 identifies the operation data from the data received by the second Bluetooth stack 208B, and provides the identified operation data to an input dispatcher 228 of the device firmware 218. The input dispatcher 228 assigns the operation data to an assistant application 232 that is installed on the second electronic device 204 to recognize user requests in the operation data and initiate operations in response to the user requests.

In some implementations, the stream of audio data 232 is collected by the microphone 206 of the first electronic device 202 is directly dispatched by the Kernal/HAL 216 to a remote control application 236 associated with the first electronic device 202. The remote control application 236 collaborates (260) with an audio manager 234 of the device firmware 218 and the assistant application 232 installed on the second electronic device 204 to recognize and respond to the user requests in the stream of audio data 230. The audio manager 234 implements a real time data processing mode and processes audio data 230 on a data packet level. That said, the audio manager 234 is configured to identify the audio data samples from the data packets in the plurality of ordered sequences of audio data packets received from the first electronic device 202, compensates for erroneous, missing, and out-of-order data packets, organizes the received audio data samples to another sequence of audio data packets, and passes (262) the sequence of audio data packets to the assistant application 232 for subsequent audio processing or transfer.

Alternatively, in some implementations, the second electronic device 204 includes a file-based audio data processing module 238 that implements a batch data processing mode and process audio data 230 received from the first electronic device 202 to a data file. The file-based audio data processing module 238 is either integrated (238A) in the device firmware 218 (i.e., an operating system) or installed (238B) as a user application among the application and service programs 222. The remote control application 236 provides (270 or 280) the audio data 230 to the processing module 238. The processing module 238 is configured to identify the audio data samples from the data packets in the plurality of ordered sequences of audio data packets received from the first electronic device 202, caches the data packets in a data file, and provides (272 or 282) the data file to the assistant application 232 for subsequent audio processing or transfer. The second electronic device 204 further includes an audio data buffer 214 for storing the data file.

The audio data samples are processed by the audio manager 234 and the processing module 238 alternatingly in a real time data processing mode and in a batch data processing mode, respectively. The second electronic device 204 switches between these two audio data processing modes depending on whether communication, computation and storage capabilities of the second electronic device 204 can support real time transfer of audio data samples. In some implementations, such determination and mode switching are implemented dynamically, while an ordered sequence of audio data packets is being processed by the audio manager 234 or processing module 238. Alternatively, such determination and mode switching are implemented between two distinct recording sessions, i.e., between two distinct sequences of audio data packets each of which is independently processed by one of the real time and batch data processing modes. Each recording session is optionally activated by a user action on the first electronic device 202 or a voice activation detected from the audio data 230 collected by the electronic device 202.

More specifically, upon receiving the stream of audio data 230, the second electronic device 204 monitors the audio data 230 to determine whether communication, computation and storage capabilities of the second electronic device 204 can support processing of audio data samples in the real time data processing mode. For example, the second electronic device 204 determines in real time whether a data sample latency of data samples in the audio data 230 exceeds a latency tolerance, e.g., before or after the audio manager 234 processes the data samples in the audio data 230. In another example, the second electronic device 204 determines, in real time, whether a rate of missing audio data samples of data samples in the audio data 230 exceeds a missing rate tolerance or a rate of out-of-order audio data samples of data samples in the audio data 230 exceeds an out-of-order rate tolerance, e.g., before or after the audio manager 234 processes the data samples in the audio data 230. In some implementations, the second electronic device 204 monitors its central processing unit (CPU) utilization rate and determines that it cannot support processing of audio data samples in real time if the CPU utilization rate exceeds a predetermined utilization percentage (e.g., 85%). In accordance with the determination result, the second electronic device 204 selects the audio manager 234 or the file-based audio data processing module 238 to process the stream of audio data 230 in real time or in batch, respectively.

In some implementations, the second electronic device 204 is configured to process an output of the audio manager 234 or the processing module 238 locally to recognize the user requests therefrom for the purposes of protecting privacy of a user, and optionally provide the processed output to the remote control application 236 for controlling the first electronic device 202. Alternatively, in some implementations, the second electronic device 204 is configured to pre-process the output of the audio manager 234 or the processing module 238 prior to sending it to a remote server system 106 to recognize the user requests therefrom. Alternatively, in some implementations, the second electronic device 204 has a limited speech recognition capability, e.g., when the second electronic device 204 is intended to be a low cost device. The second electronic device 204 is configured to send the entire output of the audio manager 234 or the processing module 238 to the remote server system 106 and rely on the server system 106 to recognize the user requests therefrom.

Figure 3:
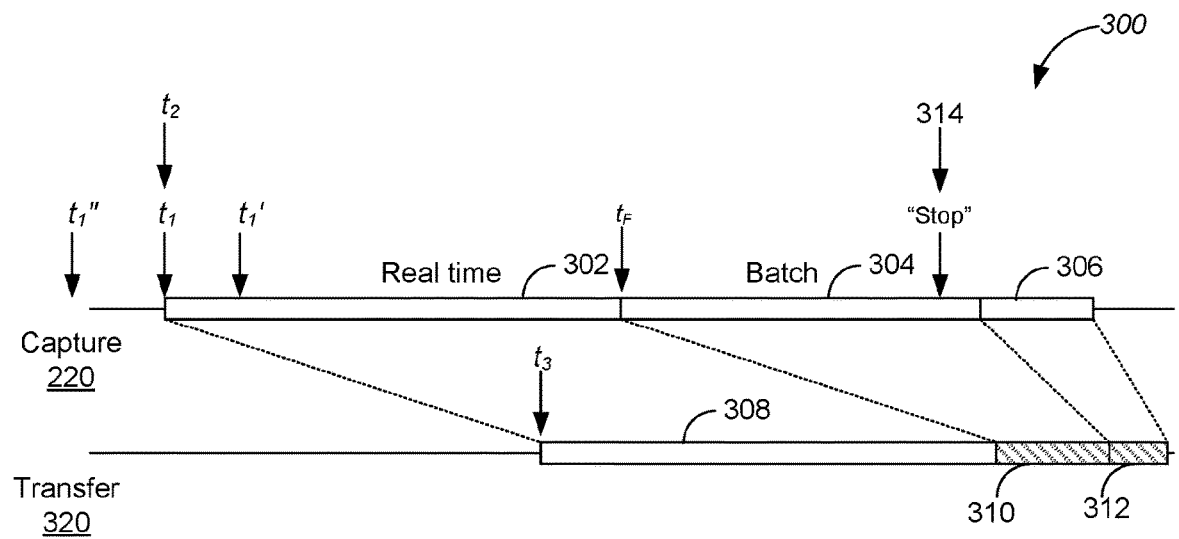
FIG. 3 is a schematic diagram illustrating an example audio data processing process switching from a real time data processing mode to a batch data processing mode, in accordance with some implementations.

FIG. 3 is a schematic diagram illustrating an example audio data processing process 300 switching from a real time data processing mode to a batch data processing mode in accordance with some implementations. An audio signal 220 is captured using a microphone 206 of a first electronic device 202, and sampled at an audio sampling rate to obtain a first sequence of audio data samples 302 and a second sequence of audio data samples 304 that follows the first sequence of audio data samples 302. The first sequence of audio data samples 302 is transferred to a second electronic device 204 via a communication channel 208. In some implementations, audio data samples in the first sequence 302 and the second sequence 304 are grouped into a plurality of audio data packets, and each data packet includes one or more consecutive audio data samples. Optionally, the second sequence 304 of audio data samples immediately follows the first sequence 302. Optionally, the second sequence 304 of audio data samples is separated from the first sequence 302 by a break. The plurality of audio data packets is streamed to the second electronic device 204. In some situations, one or more data packets are reordered or dropped from the first and second sequences 302 and 304 during the course of being transferred over the communication channel 208.

Audio data packets 308 are grouped from the first sequence of audio data samples 302, and processed by the second electronic device 204 in the real time processing mode where erroneous, missing, and out-of-order data packets in the audio data packets 308 may both occur and be corrected. That said, one or more data packets 308 are dropped or reordered by the second electronic device 204 (specifically, by the audio manager 234). While or after processing the first sequence of audio data samples 302, the second electronic device 204 determines that at least one of communication, computation and storage capabilities of the second electronic device 204 cannot support processing of audio data samples in the real time data processing mode. In response to such a determination (at a time $t_F$), the second electronic device 204 aborts the real time data processing mode and initiates a batch data processing mode to process the second sequence of audio data samples 304. Specifically, the second electronic device 204 caches in an audio data buffer 214 the second sequence of audio data samples 304, and generates a data file 310 including the second sequence of audio data samples 304 in the batch data processing mode. In some implementations, the second electronic device 204 determines a corresponding capability of supporting the processing of audio data samples in the real time data processing mode based on at least one of: a data sample latency, a rate of missing audio data samples, a rate of out-of-order audio data samples, and a CPU utilization rate associated with the second electronic device 204.

In some implementations, the second electronic device 204 ceases processing of the second sequence of audio data samples 304 in accordance with a determination that communication, computation and storage capabilities of the second electronic device 204 can support processing of audio data samples in the real time data processing mode. Alternatively, in some implementations, the second electronic device 204 is configured to limit the second sequence 304 to include a predefined number of audio data samples. The second electronic device 204 processes the second sequence of audio data samples 304 to be cached in a first data file 310 when the predefined number is reached. The second electronic device 204 then organizes a third sequence of audio data samples 306 that immediately follows the second sequence of audio data samples 304 in a second data file 312. The second data file 312 is transferred when the predefined number of audio data samples are included in the third sequence of audio data samples 306 or when it is determined that the second electronic device 204 can support processing of audio data samples in the real time data processing mode.

Under some circumstances, a current number of audio data samples included in a data file 310 or 312 has not reached the predefined number when it is determined that the second electronic device 204 can support processing of audio data samples in the real time data processing mode. In accordance with the determination, the data file 310 or 312 may be transferred immediately with the current number of audio data samples. Optionally, the data file 310 or 312 is aborted from being transferred, and the current number of audio data samples are re-organized into data packets for real time audio data processing by the audio manager 234 of the second electronic device 204.

In some implementations, the processed first sequence of audio data samples 308 and the data file 310 including the second sequence of audio data samples are transferred (320) to a server system 106. The processed first sequence of audio data samples 302 has a first data transfer rate corresponding to the real time data processing mode and the second sequence of audio data samples 304 has a second data transfer rate corresponding to the batch data processing mode. The second data transfer rate is greater than the first data transfer rate. In some implementations, the first data transfer rate is slower than the audio sampling rate of the audio signal 220, and the second data transfer rate is greater than the audio sampling rate.

Figure 4:
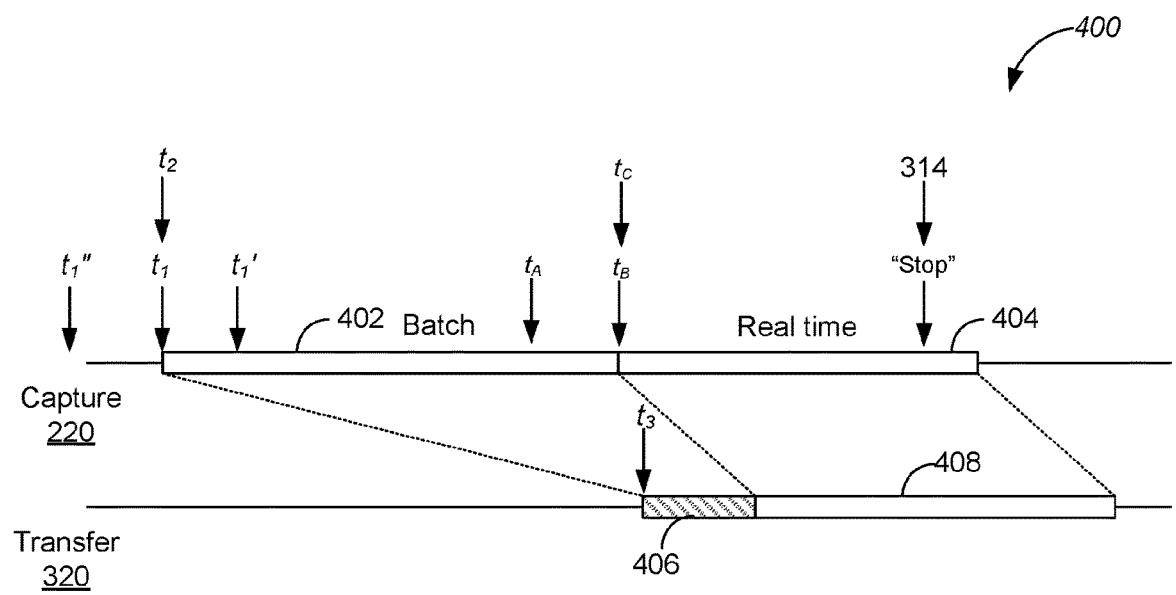
FIG. 4 is a schematic diagram illustrating an example audio data processing process switching from a batch data processing mode to a real time data processing mode, in accordance with some implementations.

FIG. 4 is a schematic diagram illustrating an example audio data processing process 400 switching from a batch data processing mode to a real time data processing mode in accordance with some implementations. An audio signal 220 is captured using a microphone of a first electronic device 202, and sampled at an audio sampling rate to obtain a first sequence of audio data samples 402 and a second sequence of audio data samples 404 that follows the first sequence of audio data samples 402. Both the first sequence of audio data samples 402 and the second sequence of audio data samples 404 are transferred to a second electronic device 204 via a communication channel 208. The first sequence of audio data samples 302 is processed by the second electronic device 204 according to a batch data processing mode. Audio data samples in the first sequence 402 are cached in an audio data buffer 214 of the first electronic device 202 and organized into a data file 406.

While or after processing the first sequence of audio data samples 402, the second electronic device 204 detects or determines that the second electronic device 204 can support processing of audio data samples in a real time data processing mode. Optionally, in accordance with such a determination (at a first time $t_A$), the second electronic device 204 continues to add more audio data samples to the first sequence 402 until a number of the audio data samples of the first sequence 402 reaches a predefined number at a second time $t_B$. The second electronic device 204 completes caching the first sequence of audio data samples 402 in the data file 406, before it starts to process, in the real time data processing mode, the second sequence of audio data samples 404 collected subsequently to the first sequence of audio data samples 402. Alternatively, in some implementations, in accordance with the determination (at a time $t_C$), the second electronic device 204 ceases adding audio data samples to the first sequence 402 independently of whether a number of audio data samples to the first sequence 402 has reached the predefined number. The second electronic device 204 prepares the data file 406 at the time $t_C$, thereby terminating the batch data processing mode. The second electronic device 204 immediately starts to transfer the second sequence of audio data samples 404 collected subsequently to the first sequence of audio data samples 402 in the real time data processing mode. Further, in some implementations (not shown), upon the determination (e.g., at the time $t_C$), the second electronic device 204 aborts processing the first sequence 402 of audio data samples in the batch data processing mode and starts to process the first sequence of audio data samples 402 into data packets 408 immediately in the real time data processing mode. After the first sequence of audio data samples 402 is transferred, the second electronic device 204 continues to process the second sequence of audio data samples 404 in the real time data processing mode.

Each of the first sequences of audio data samples 302 and 402 optionally begins the stream of audio data 230 sent to the second electronic device 204 or is in the middle of the stream of audio data 230. Likewise, each of the second sequences of audio data samples 304 and 404 and the third sequence of audio data samples 306 optionally is the last sequence in the stream of audio data 230 sent to the second electronic device 204 or is in the middle of the stream of audio data 230. It is noted that in some implementations, the first sequence of audio data samples 302 or 402 does not immediately precedes the second sequence of audio data samples 304 or 404. The first and second sequences are captured during two distinct recording sessions separated by a break. The second electronic device 204 determines whether it can support processing of audio data samples in the real time data processing mode during the break separating the two recording sessions.

Figure 5:
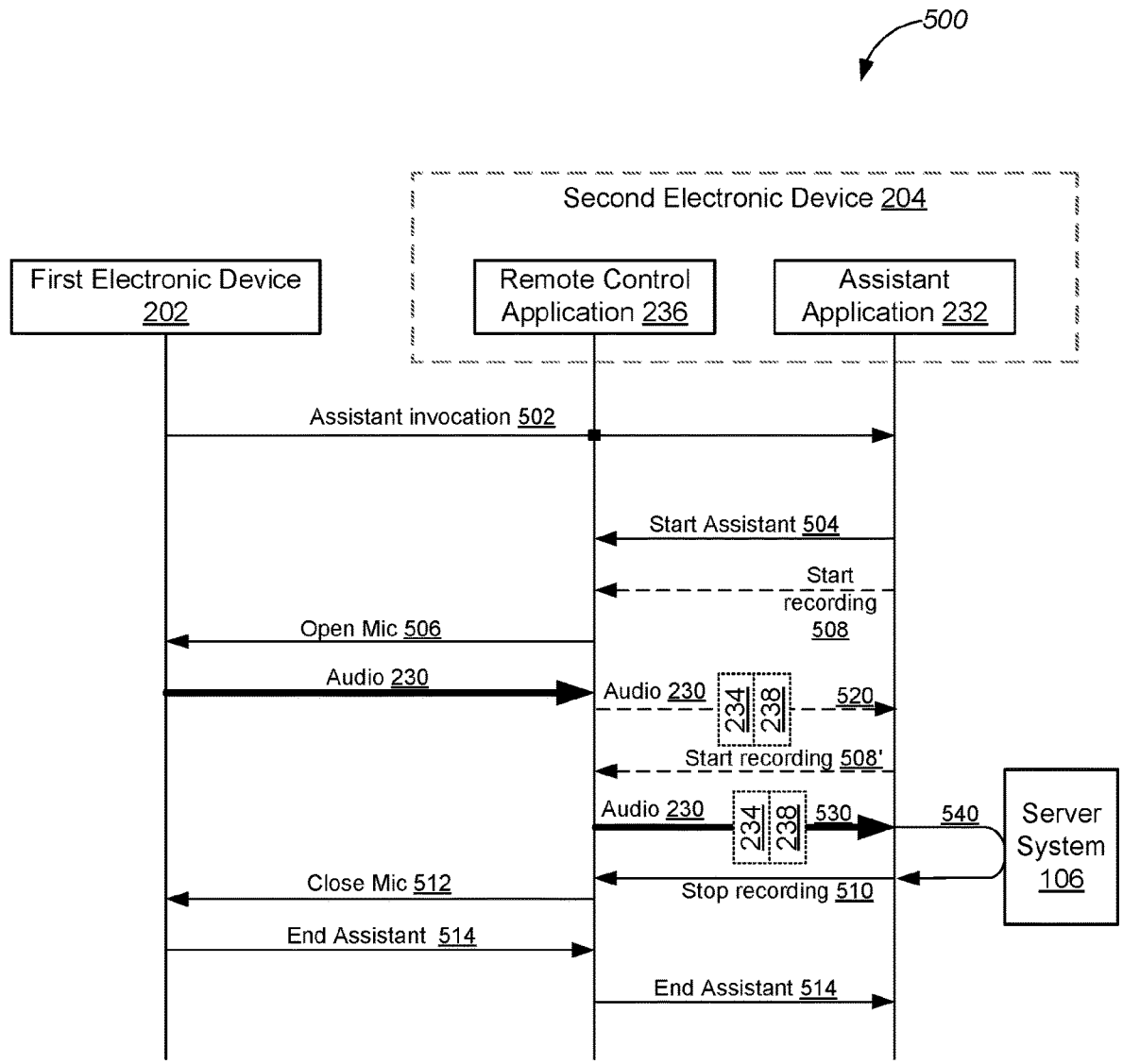
FIG. 5 is a schematic diagram illustrating an example voice assistant process initiated by a user action or a voice input, in accordance with some implementations.

FIG. 5 is a schematic diagram illustrating an example voice assistant process 500 initiated by a user action or a voice input in accordance with some implementations. The voice assistant process 500 is collaboratively implemented by a first electronic device 202 and a second electronic device 204. In some implementations, the first electronic device 202 includes a physical assistant button (e.g., an assistant button 606 in FIG. 6), and a user is allowed to request initiation or termination of voice assistant functions via a user action on the assistant button. For example, the user applies a press on the physical assistant button to initiate the voice assistant process 500 (also called a recording session). While the user holds the press on the assistant button, an audio signal is continuously collected by a microphone 206 of the first electronic device 202 for audio data sampling, transfer and recognition via the voice assistant process 500. The microphone 206 does not stop collecting the audio signal, until the user releases the press on the assistant button to complete the corresponding recording session.

In some implementations, in response to detection of a first user action, the first electronic device 202 sends an assistant invocation request 502 to a remote control application 236 and an assistant application 232 of the second electronic device 204. In response to the assistant invocation request 502, the assistant application 232 verifies that the first electronic device 202 is permitted to implement the voice assistant process 500 with the second electronic device 204, and sends an instruction to start assistant 504 to the remote control application 236. In response to the instruction to start assistant 504, the remote control application 236 sends an open microphone instruction 506 to the first electronic device 202. After the microphone 206 of the first electronic device 202 is turned on, audio data samples 230 are collected and transferred to the second electronic device 204. After being transferred to the second electronic device 204, the audio data samples 230 are processed (520 and 530) by the audio manager 234 associated with a real time data processing mode or by the file-based audio data processing module 238 associated with a batch data processing mode. In some implementations, the real time and batch data processing modes alternate dynamically at the second electronic device 204, e.g., based on a data sample latency, rate of missing audio data samples, rate of out of order audio data samples, or CPU utilization rate associated with the second electronic device 204. In some implementations, only one of the real time and batch data processing modes is activated during each recording section activated in response to detection of the first user action.

In some implementations, the assistant application 232 sends an instruction to start recording 508 to the remote control application 236, such that the remote control application 236 may control the first electronic device 202 to capture the audio data collected by the first electronic device 202. The instruction to start recording 508 is optionally issued with the instruction to start assistant 504 and configured to trigger the open microphone instruction 506. In response to the instruction to start recording 508, the audio data samples 230 are recorded by the second electronic device 204 after they are transferred from the first electronic device 202. Alternatively, in some implementations, the instruction to start recording 508' is issued by the assistant application after a subset of the audio data samples 230 have been received by the second electronic device 204. The instruction to start recording 508' may be issued based on content of the subset of the audio data samples (e.g., a user request in the content), and the subset of the audio data samples 230 is not recorded by the second electronic device 204.

In some implementations, the assistant application 232 sends an instruction to stop recording 510 to both an audio manager 234 and the remote control application 236, such that the remote control application 236 may issue a close microphone instruction 512 to control the first electronic device 202 to turn off its microphone 206. Alternatively, in some implementations, the user of the first electronic device 202 terminates the first user action that initiated the voice assistant process 500 or applies a second user action (e.g., a release of the assistant button) to terminate the voice assistant process 500. In response to the second user action, the microphone 206 of the first electronic device 202 is turned off, and a request for ending assistant 514 is sent to the remote control application 236 and assistant application 232 of the second electronic device 204.

Referring to FIGS. 3 and 4, the microphone 206 of the first electronic device 202 is set to be turned on and start to capture the audio signal at different times with respect to the first user press. In some implementations, the first electronic device 202 receives a first user action requesting recording of the audio signal at a first time $t_1$, and its microphone 206 is turned on to capture the audio signal immediately in response to the first user action at a second time $t_2$, independently of whether the open microphone instruction 506 is issued from the second electronic device 204. The second time $t_2$ is substantially concurrently with the first time $t_1$. Alternatively, in some implementations, the first electronic device 202 receives a first user action requesting recording of the audio signal at a first time $t_1'$. The audio signal is captured by the microphone at a second time $t_2$ that precedes the first time $t_1'$. The audio data corresponding to a duration between the times $t_2$ and $t_1'$ are cached, but still transferred to the second electronic device 204 in response to the first user action. Additionally, in some implementations, the first electronic device 202 receives a first user action requesting recording of the audio signal at a first time $t_1''$, and starts to capture the audio signal at a second time $t_2$ that is subsequent to the first time $t_1''$, e.g., delayed from the first time $t_1''$ by a predefined buffer time (such as 5 seconds).

It is noted that in some implementations, the first electronic device 202 waits to receive an audio data request including the open microphone instruction 506 from the second electronic device 204, in a duration of time between receiving the first user action time ($t_1$, $t_1'$, or $t_1''$) and transferring the captured audio data to the second electronic device 204 at $t_2$. The second electronic device 204 obtains an approval to send the audio data request in response to the first user action, and this approval is granted by the assistant application 232 of the second electronic device 204 or by a remote server system 106.

In some situations, the voice assistant process 500 is initiated by a voice input. The microphone 206 of the first electronic device 202 is configured to continuously collect audio signals and provide corresponding audio data to the second electronic device 204 regardless of whether the first electronic device 202 is at a sleep mode and an active mode. At the sleep mode, the audio data is not processed to recognize any user requests for the voice assistant functions that are used to control media devices or user applications, until one or more predefined hot words (e.g., "Hi Google") are detected to enable the active mode. The second electronic device 204 is configured to detect one or more predefined hot words in the audio data locally and initiates the voice assistant process 500 in response to detection of the one or more predefined hot words.

Referring to FIG. 5, in some implementations, the assistant invocation request 502 includes one or more predefined hot words. The second electronic device 204 confirms the assistant invocation request 502 upon detecting the hot words in the audio data received from the first electronic device 202. In response to the assistant invocation request 502, the assistant application 232 verifies that the first electronic device 202 is permitted to implement the voice assistant process 500 with the second electronic device 204, and sends an instruction to start assistant 504 to the remote control application 236. The second electronic device 204 is controlled to operate in an active mode to process the audio data samples 230 locally in a real time data processing mode or a batch data processing mode to identify additional user requests. Further, in some implementations, the assistant application 232 identifies a user request to stop recording (e.g., "Google, stop recording" in FIGS. 3 and 4) in the audio data 230 provided by the first electronic device. The assistant application 232 generates an instruction to stop recording 510 in the audio data samples 230, and send the instruction 510 to an audio manager 234 and the remote control application 236, such that the remote control application 236 may issue a close microphone instruction 512 to control the first electronic device 202 to turn off its microphone. By these means, the voice assistant process 500 is initiated and terminated base on the audio data captured by the first electronic device 202 without using any physical user action.

Referring to FIG. 3, in an example, a request 314 to cease capturing the audio signal is recognized in the audio signal 220, and sent from the second electronic device 204 to the first electronic device 202. In response to the request 314, the second electronic device 204 completes processing of the first data file 310 including the second sequence of data samples 304, but aborts transferring the second data file 312 including the third sequence of data samples 306 that immediately follows the second sequence 304. In contrast, referring to FIG. 4, in another example, upon receiving the request 314, the second electronic device 204 aborts processing subsequent data packets that follow the request 314 in the second sequence of audio data samples 404.

FIG. 6 illustrates an example remote control device 104 configured to transfer audio data to a television device, in accordance with some implementations. The plurality of user buttons of the remote control device 104 includes one or more of a power button 602, a home button 604, an assistant button 606, a cycle button 608 (also called a play/cycle button), a previous button 610, a next button 612, a preview/backdrop button 614 and a volume control button 616. A user actuation on the power button 602 powers on a media device coupled to the remote control device 104 when the media device is off prior to the user actuation, and powers off the media device when the media device is on prior to the user actuation. A user actuation on the home button 604 controls the media device coupled to the remote control device 104 to display a home screen. For example, the home screen displays a specific advertisement clip or a randomly selected media program provided by a predetermined Internet content channel. In some implementations, the power button 602 or the home button 604 functions as a quick cast button configured to enable immediate play of media content provided by a specific Internet content channel.

A user action on the assistant button 606 controls a microphone 206 integrated in the remote control device 104 to collect audio signals in the media environment 100, and user requests are extracted from the audio signals to control one or more media play devices (e.g., the TV device 102) located in the media environment 100. In some implementations, the microphone 206 of the remote control device 104 initiates collecting audio signals from the environment 100 when a first brief press is applied on the assistant button 606, and a second brief press or a user request is applied to cease collecting the audio signals. Alternatively, in some implementations, the microphone 206 of the remote control device 104 only collects audio signals from the environment 100 when the assistant button 606 is being pressed, and ceases collecting the audio signals when the assistant button 606 is released. Additionally, in some implementations, the microphone 206 of the remote control device 104 continuously captures audio signals from the environment 100, and the audio signals include one or more predefined hot words and/or user requests. The user requests can be used to control the remote control device 104 or one or more media devices or applications coupled to the remote control device 104.

In this application, audio data is processed at the second electronic device 204 (e.g., a network-connected television device 102) having two audio data processing modes that includes a real-time data processing mode and a batch data processing mode. The second electronic device 204 determines whether communication, caching and processing capabilities of the second electronic device 204 can support processing of audio data samples in the real time data processing mode. In accordance with a determination that the second electronic device 204 can support processing of audio data samples in the real time data processing mode, the second electronic device 204 processes subsequent audio data samples according to the real time data processing mode on a data packet level. In accordance with a determination that the second electronic device 204 cannot support processing of audio data samples in the real time data processing mode, the second electronic device 204 caches, in a buffer of the second electronic device 204, subsequent audio data samples, and generates a data file including these audio data samples in a batch data processing mode. In some implementations, determination and mode enabling are implemented during a break between two recording sessions. Alternatively, in some implementations, determination and mode switching are implemented dynamically during the same recording session.

Figure 7:
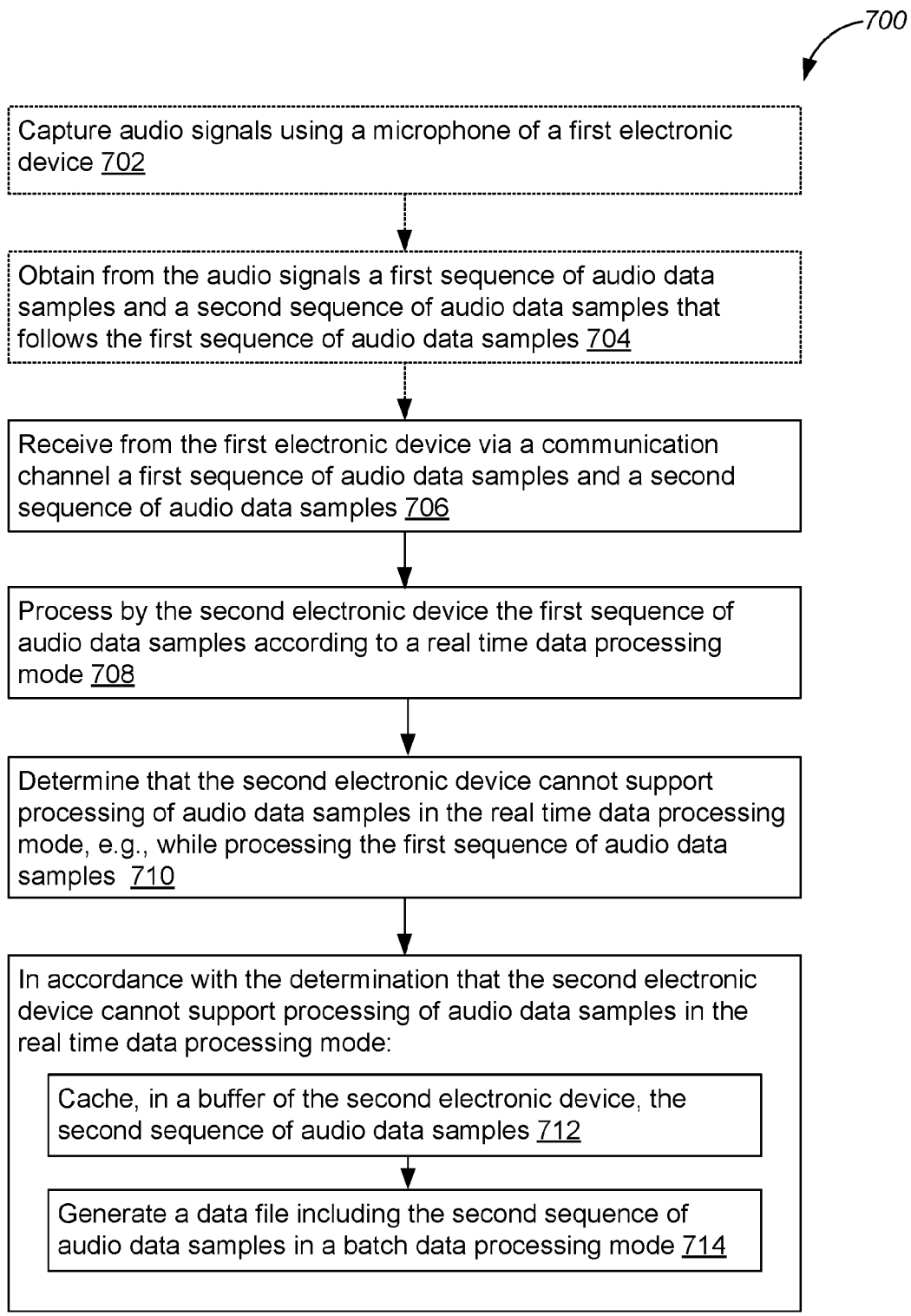
FIG. 7 is a flow chart of a method for processing audio data dynamically in two audio data processing modes, in accordance with some implementations.

FIG. 7 is a flow chart of a method 700 for processing audio data dynamically in two audio data processing modes (from a real time data processing mode to a batch data processing mode), in accordance with some implementations. The method 700 is performed a first electronic device 202 and a second electronic device 204, and optionally governed by instructions that are stored in a non-transitory computer readable storage medium and that are executed by one or more processors of the respective electronic device. Each of the operations shown in FIG. 7 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 700 may be combined and/or the order of some operations may be changed.

Audio signals are captured (702) using a microphone 206 of the first electronic device 202. The first electronic device 202 obtains (704) from the audio signal a first sequence of audio data samples 302 and a second sequence of audio data samples 304 that follows the first sequence of audio data samples 302, and transfers to the second electronic device 204 via a communication channel 208 the first sequence of audio data samples 302 according to a real time data processing mode. The second electronic device 204 receives (706), from the first electronic device 202 via the communication channel 208, the first sequence of audio data samples 302 and the second sequence of audio data samples 304. While or after the first sequence of audio data samples 302, the second electronic device 204 determines (708) that the second electronic device 204 cannot support processing of audio data samples in the real time data processing mode. In accordance with the determination that the second electronic device 204 cannot support processing of audio data samples in the real time data processing mode, the second electronic device 204 caches (712), in a buffer of the second electronic device, the second sequence of audio data samples 304, and generates (714) a data file 310 including the second sequence of audio data samples 304 in the batch data processing mode.

In some implementations, the second electronic device 204 transfers (e.g., 540 in FIG. 5) the processed first sequence of audio data samples and the data file including the second sequence of audio data samples to a server system 106. The first sequence of audio data samples 302 has a first data transfer rate correspond to the real time data processing mode, and the second sequence of audio data samples 304 has a second data transfer rate corresponding to the batch data processing mode. The second data transfer rate is greater than the first data transfer rate. Further, in an example, the audio signals captured by the first electronic device 202 are sampled at an audio sampling rate to obtain the first and second sequences of audio data samples 302 and 304. The first data transfer rate is slower than the audio sampling rate, and the second data transfer rate is greater than the audio sampling rate.

In some implementations, the audio data samples in the first sequence 302 are grouped into a plurality of audio data packets in the real time data processing mode. Each audio data packet includes one or more consecutive audio data samples that are optionally organized according to a consistent data format. The plurality of audio data packets are streamed to a server system 106.

In some implementations, the second electronic device 204 is determined as not supporting the transferring of audio data samples in the real time data processing mode based on at least one of: a data sample latency, a rate of missing audio data samples, and a rate of out-of-order audio data samples associated with the second electronic device 204. Specifically, in an example, the data sample latency of a subset of the processed first sequence of audio data samples exceeds a latency tolerance. In another example, a rate of missing audio data samples of the processed first sequence of audio data samples 302 exceeds a missing rate tolerance. In yet another example, a rate of out-of-order audio data samples of the processed first sequence of audio data samples 302 exceeds an out-of-order rate tolerance.

In some implementations, a first user action requesting recording of the audio signals are received at the first electronic device 202. The audio signals are captured in response to the first user action. An example is the first user action is a press on an assistant button of the first electronic device 202. The press initiate a process to obtain an approval by an assistant application 232 of the second electronic device 204 or a server system 106. Upon receiving the approval, the audio signals are being captured, processed, and recorded. Specifically, in an example, the first electronic device 202 receives the first user action requesting recording of the audio signals at a first time $t_1'$, wherein capturing the audio signals is initiated at a second time $t_2$ subsequent to the first time $t_1'$. The second time $t_2$ is delayed from the first time by a predefined buffer time. Specifically, in some situations, in response to the first user action, the first electronic device 202 receives an audio data request from the second electronic device 204. The second electronic device 204 is configured to obtain an approval to send the audio data request in response to the first user action. Transferring the first sequence of audio data samples is initiated in response to the audio data request.

In some implementations, the data file 310 includes a first data file 310. After generating the first data file 310, the second electronic device 204 continues to generate a second data file 312 including a third sequence of audio data samples 306 in the batch data processing mode. The third sequence of audio data samples 306 immediately follows the second sequence of audio data samples 304 in the audio signals, and each of the second and third sequences of audio data samples 304 and 306 has a predefined number of data samples.

In some implementations, the second electronic device 204 is configured to transfer the processed first and second sequences of audio data samples 302 and 304 to a server system 106 for audio processing (e.g., voice recognition). The server system 106 hosts a virtual user domain including a user account. The first and second electronic devices 202 and 204 are linked to the user account.

Alternatively, in some implementations, the audio signals include one or more predefined hot words or a user request. The second electronic device 204 is configured to process the first and second sequences of audio data samples locally to identify the one or more predefined hot words or user request in the audio signal. Further, in some implementations, the user request includes a request to cease capturing the audio signal. The request to cease capturing the audio signals are recognized by the second electronic device 204 and provided to the first electronic device 202 thereby. In response to the request, the first electronic device 202 aborts transferring the sequence of audio data samples that follows the second sequence of audio data samples 304.

In some implementations, while transferring the second sequence of data samples 304, the second electronic device 204 receives a second user action for ceasing capturing the audio signal. In response to the second user action, the second electronic device 204 aborts receiving a sequence of audio data samples that immediately follows the second sequence of audio data samples 304.

Figure 8:
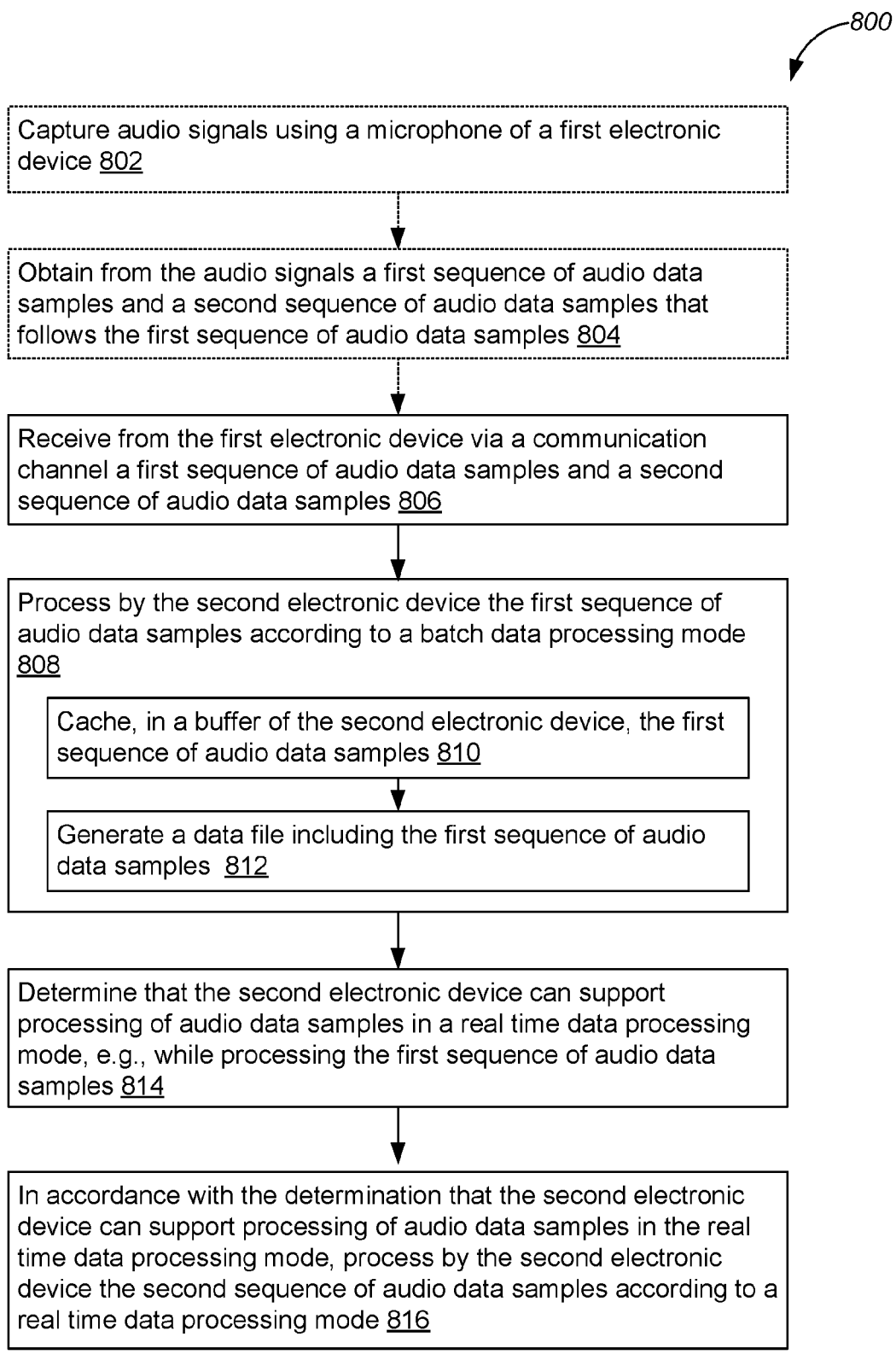
FIG. 8 is a flow chart of another method for processing audio data dynamically in two audio data processing modes, in accordance with some implementations.

FIG. 8 is a flow chart of a method 800 for processing audio data dynamically in two audio data processing modes (from a batch data processing mode to a real time data processing mode), in accordance with some implementations. The method 800 is performed by a first electronic device 202 and a second electronic device 204, and optionally governed by instructions that are stored in a non-transitory computer readable storage medium and that are executed by one or more processors of the respective electronic device. Each of the operations shown in FIG. 8 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 800 may be combined and/or the order of some operations may be changed.

Audio signals are captured (802) using a microphone of the first electronic device 202. The first electronic device 202 obtains (804) a first sequence of audio data samples 402 and a second sequence of audio data samples 404 that follows the second sequence of audio data samples 402 in the audio signals. The second electronic device 204 receives (806), from a first electronic device 202, the first sequence of audio data samples 402 and the second sequence of audio data samples 404. The second electronic device 204 processes the first sequence of audio data samples 402 according to the batch data processing mode, including caching (810), in a buffer of a second electronic device, the first sequence of audio data samples 402, and generating (812) a data file including the first sequence of audio data samples 402. While or after processing the first sequence of audio data samples, the second electronic device 204 determines (814) that the second electronic device 204 can support processing of audio data samples in a real time data processing mode. In accordance with the determination that the second electronic device 204 can support processing of audio data samples in the real time data processing mode, the second electronic device 204 processes (816) the second sequence of audio data samples according to the real time data processing mode.

In some implementations, the audio data samples 402 and 404 are transferred to a server system 106. The first sequence of audio data samples 402 has a first data transfer rate corresponding to the real time data processing mode, and the second sequence of audio data samples 404 has a second data transfer rate corresponding to the batch data processing mode. The first data transfer rate is greater than the second data transfer rate. Further, in an example, the second data transfer rate is slower than the audio sampling rate, and the first data transfer rate is greater than the audio sampling rate. In some implementations, the audio data samples in the second sequence 404 are grouped into a plurality of audio data packets in the real time data processing mode, and the plurality of audio data packets are optionally streamed to the server system 106 in real time.

Referring to FIGS. 7 and 8, in some implementations, the first electronic device 202 includes a remote control device 104, and the second electronic device 204 includes a network-connected TV device 102 configured to be controlled by the remote control device 104. In some implementations, the second electronic device 204 includes one or more processors, and memory storing one or more programs configured to implement an Android operating system and one or more user applications on the second electronic device 204. In some implementations, the first electronic device 202 is battery powered.

It should be understood that the particular order in which the operations in each of FIGS. 7 and 8 have been described are merely exemplary and are not intended to indicate that the described order is the only order in which the operations could be performed. One of ordinary skill in the art would recognize various ways to display information items and focus content in a unified user interface as described herein. Additionally, it should be noted that details described with respect to one of the methods 700, 750, 800 and 850 are also applicable in an analogous manner to any other ones of the methods 700, 750, 800 and 850. For brevity, the analogous details are not repeated.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described implementations. The first electronic device and the second electronic device are both electronic device, but they are not the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of processing audio data, comprising:
receiving, by a second electronic device, a first sequence of audio data samples and a second sequence of audio data samples from a first electronic device, wherein the second sequence of audio data samples follows the first sequence of audio data samples in audio signals captured by a microphone of the first electronic device;
processing, by the second electronic device, the first sequence of audio data samples according to a real time data processing mode;
determining that the second electronic device cannot support processing of audio data samples in the real time data processing mode; and
in accordance with the determination that the second electronic device cannot support processing of audio data samples in the real time data processing mode, caching, in a buffer of the second electronic device, the second sequence of audio data samples, and generating a data file including the second sequence of audio data samples in a batch data processing mode.

2. The method of claim 1, further comprising:
transferring the processed first sequence of audio data samples and the data file including the second sequence of audio data samples to a server system;
wherein the first sequence of audio data samples has a first data transfer rate corresponding to the real time data processing mode, and the second sequence of audio data samples has a second data transfer rate corresponding to the batch data processing mode; and
wherein the second data transfer rate is greater than the first data transfer rate.

3. The method of claim 2, wherein:
the audio signals are sampled at an audio sampling rate to obtain the first and second sequences of audio data samples; and
the first data transfer rate is slower than the audio sampling rate, and the second data transfer rate is greater than the audio sampling rate.

4. The method of claim 1, wherein the method further comprises:
grouping the audio data samples in the first sequence into a plurality of audio data packets, each audio data packet including one or more consecutive audio data samples; and streaming the plurality of audio data packets to a server system.

5. The method of claim 1, wherein determining that the second electronic device cannot support the processing of audio data samples in the real time data processing mode further comprises at least one of:
   determining that a data sample latency of a subset of the processed first sequence of audio data samples exceeds a latency tolerance;
   determining that a rate of missing audio data samples of the processed first sequence of audio data samples exceeds a missing rate tolerance; and
   determining that a rate of out-of-order audio data samples of the processed first sequence of audio data samples exceeds an out-of-order rate tolerance.

6. The method of claim 1, wherein the second electronic device is determined as not supporting the transferring of audio data samples in the real time data processing mode based on at least one of: a data sample latency, a rate of missing audio data samples, or a rate of out-of-order audio data samples associated with the second electronic device.

7. The method of claim 1, further comprising:
   receiving, by the first electronic device, a first user action requesting recording of the audio signals, wherein the audio signals are captured in response to the first user action.

8. The method of claim 1, further comprising:
   receiving, by the first electronic device, a first user action requesting recording of the audio signals at a first time, wherein capturing the audio signals is initiated at a second time subsequent to the first time.

9. The method of claim 8, further comprising:
   in response to the first user action, obtaining an approval to send an audio data request and generating an audio data request by the second electronic device; and
   wherein receiving the first sequence of audio data samples is in response to the audio data request.

10. The method of claim 1, wherein the data file includes a first data file, and wherein the method further comprises:
    after generating the first data file, continuing to generate, by the second electronic device, a second data file including a third sequence of audio data samples in the batch data processing mode, wherein the third sequence of audio data samples immediately follows the second sequence of audio data samples in the audio signals, and each of the second and third sequences of audio data samples has a predefined number of data samples.

11. The method of claim 1, wherein:
    the second electronic device is configured to transfer the processed first and second sequences of audio data samples to a server system for audio processing;
    the server system hosts a virtual user domain including a user account; and
    the first and second electronic devices are linked to the user account.

12. The method of claim 1,
    wherein the audio signals include one or more predefined hot words or a user request, and the second electronic device is configured to process the first and second sequences of audio data samples locally to identify the one or more predefined hot words or user request in the audio signals.

13. The method of claim 12, wherein the user request includes a request to cease capturing the audio signals, and wherein the method further comprises:
    generating a request to cease capturing the audio signals by the second electronic device, the first electronic device configured to in response to the request, abort transferring a sequence of audio data samples that follows the second sequence of audio data samples.

14. The method of claim 1, further comprising:
    while transferring the second sequence of data samples, receiving a second user action for ceasing capturing the audio signals; and
    in response to the second user action, aborting receiving a sequence of audio data samples that immediately follows the second sequence of audio data samples.

15. The method of claim 1, wherein the first electronic device includes a remote control device, and the second electronic device includes a network-connected television device configured to be controlled by the remote control device.

16. The method of claim 1, wherein the second electronic device includes one or more processors, and memory storing one or more programs configured to implement an Android operating system and one or more user applications on the second electronic device.

17. The method of claim 16, wherein the Android operating system includes an audio manager module having instructions for processing the first sequence of audio data samples according to the real time data processing mode.

18. The method of claim 16, wherein the one or more user applications of the second electronic device includes a file-based audio data processing module for caching the second sequence of audio data samples in the buffer and generating the data file including the second sequence of audio data samples in the batch data processing mode.

19. The method of claim 1, wherein the second electronic device is determined as not support processing of audio data samples in the real time data processing mode during a recording session activated by a user action, and both the first and second sequences of data samples are processed during the recording session.

20. The method of claim 1, wherein the second electronic device is determined as not support processing of audio data samples in the real time data processing mode in a break separating two distinct recording sessions that are activated by two distinct user actions, and the first and second sequences of data samples are captured during the two distinct recording sessions.

21. A method of processing audio data, comprising:
    receiving, by a second electronic device, a first sequence of audio data samples and a second sequence of audio data samples from a first electronic device, wherein the second sequence of audio data samples follows the first sequence of audio data samples in audio signals captured by a microphone of the first electronic device;
    processing, by the second electronic device, the first sequence of audio data samples according to a batch data processing mode, including caching, in a buffer of a second electronic device, the first sequence of audio data samples, and generating a data file including the first sequence of audio data samples;
    determining that the second electronic device can support processing of audio data samples in a real time data processing mode; and
    in accordance with the determination that the second electronic device can support processing of audio data samples in the real time data processing mode, processing by the second electronic device the second sequence of audio data samples according to the real time data processing mode.

22. An electronic device, comprising:
    one or more processors; and memory having instructions stored thereon, which when executed by the one or more processors cause the processors to perform a method of processing audio data, wherein the
one or more processors are configured to:
  receive, by a second electronic device, a first sequence of audio data samples and a second sequence of audio data samples from a first electronic device, wherein the second sequence of audio data samples follows the first sequence of audio data samples in audio signals captured by a microphone of the first electronic device;
  process, by the second electronic device, the first sequence of audio data samples according to a real time data processing mode;
  determine that the second electronic device cannot support processing of audio data samples in the real time data processing mode; and
  in accordance with the determination that the second electronic device cannot support processing of audio data samples in the real time data processing mode, cache, in a buffer of the second electronic device, the second sequence of audio data samples, and generate a data file including the second sequence of audio data samples in a batch data processing mode.

23. A non-transitory computer-readable medium, having instructions stored thereon, which when executed by one or more processors cause the processors to perform a method of processing audio data, the method comprising:
  receiving, by a second electronic device, a first sequence of audio data samples and a second sequence of audio data samples from a first electronic device, wherein the second sequence of audio data samples follows the first sequence of audio data samples in audio signals captured by a microphone of the first electronic device;
  processing, by the second electronic device, the first sequence of audio data samples according to a real time data processing mode;
  determining that the second electronic device cannot support processing of audio data samples in the real time data processing mode; and
  in accordance with the determination that the second electronic device cannot support processing of audio data samples in the real time data processing mode, caching, in a buffer of the second electronic device, the second sequence of audio data samples, and generating a data file including the second sequence of audio data samples in a batch data processing mode.

* * * * *